(12) United States Patent
Eversole et al.

(10) Patent No.: US 8,939,845 B2
(45) Date of Patent: Jan. 27, 2015

(54) TUBE YOKE FOR A DRIVESHAFT ASSEMBLY

(75) Inventors: Philip A. Eversole, Toledo, OH (US); Christopher B. Corpus, Grand Rapids, OH (US); Bradley S. Jones, Waterville, OH (US); Blake T. Garretson, Liberty Center, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 13/261,596

(22) PCT Filed: Aug. 25, 2011

(86) PCT No.: PCT/US2011/001499
§ 371 (c)(1),
(2), (4) Date: Feb. 13, 2013

(87) PCT Pub. No.: WO2012/026983
PCT Pub. Date: Mar. 1, 2012

(65) Prior Publication Data
US 2013/0165241 A1   Jun. 27, 2013

Related U.S. Application Data

(60) Provisional application No. 61/377,546, filed on Aug. 27, 2010.

(51) Int. Cl.
*F16C 3/02* (2006.01)
*F16C 1/08* (2006.01)
*F16D 3/38* (2006.01)
*F16D 1/10* (2006.01)

(52) U.S. Cl.
CPC . *F16C 1/08* (2013.01); *F16D 3/387* (2013.01); *F16D 2001/102* (2013.01); *F16D 2001/103* (2013.01)
USPC .......................................... 464/134; 464/182

(58) Field of Classification Search
USPC ................................ 464/134, 135, 182, 904
See application file for complete search history.

(56) References Cited

U.S. PATENT DOCUMENTS

| | | |
|---|---|---|
| 3,721,110 A | 3/1973 | Borneman |
| 4,192,153 A | 3/1980 | Fisher |
| 4,573,946 A | 3/1986 | Brissette |
| 4,702,722 A | 10/1987 | Narue et al. |
| 4,968,173 A | 11/1990 | Fujita |
| 5,234,378 A | 8/1993 | Helgesen et al. |
| 5,692,959 A | 12/1997 | Schabel |

(Continued)

FOREIGN PATENT DOCUMENTS

| | | |
|---|---|---|
| DE | 10 054 384 A1 | 5/2002 |
| EP | 0 003 873 A1 | 9/1979 |

(Continued)

*Primary Examiner* — Gregory Binda
*Assistant Examiner* — Josh Skroupa
(74) *Attorney, Agent, or Firm* — Marshall & Melhorn, LLC

(57) ABSTRACT

A tube yoke for a driveshaft assembly includes a tube seat and a pair of lugs. The lugs outwardly project from the tube seat. The tube seat comprises a base, a wall, and a plurality of stiffening ribs. The stiffening ribs extend between an inner surface of the base and an end surface of the wall. A portion of the stiffening ribs between the inner surface of the base and the end surface of the wall gradually decreases in thickness. A method of reducing the radial deformation of the tube yoke of a driveshaft assembly is also provided.

17 Claims, 10 Drawing Sheets

(56) References Cited

U.S. PATENT DOCUMENTS

| | | |
|---|---|---|
| 5,946,977 A | 9/1999 | Sato et al. |
| 6,531,688 B2 | 3/2003 | Yablochnikov |
| 6,662,423 B2 | 12/2003 | Menosky et al. |
| 6,949,026 B2 | 9/2005 | Morsches et al. |
| 7,699,710 B2 | 4/2010 | Wette |
| 2001/0007833 A1 | 7/2001 | Quercetti |

FOREIGN PATENT DOCUMENTS

| | | |
|---|---|---|
| FR | 2 775 946 A1 | 9/1999 |
| GB | 2 370 093 A | 6/2002 |
| JP | 2009030679 A * | 2/2009 |

* cited by examiner

TUBE YOKE FOR A DRIVESHAFT ASSEMBLY

RELATED APPLICATION

This application is claiming the benefit, under 35 U.S.C. 119(e), of the provisional application which was granted Ser. No. 61/377,546 filed on Aug. 27, 2010. The provisional application is hereby incorporated by reference.

BACKGROUND OF THE INVENTION

This invention relates in general to a driveshaft assembly. In particular, this invention relates to a driveshaft assembly having an improved tube yoke design which enhances performance of the driveshaft assembly when torque is applied thereto.

A driveline assembly is used to transmit rotational power from a source, such as an engine, to a driven component, such as a pair of wheels. In a typical driveline assembly, a driveshaft assembly is included. In most cases, the driveshaft assembly includes a driveshaft tube and a tube yoke. The tube yoke usually includes a tube seat, which is connected to the driveshaft tube, and a pair of spaced apart lugs.

The tube yoke is subject to torque loads. The torque loads can cause radial deformation of the tube yoke and, specifically, the tube seat. Radial deformation, and especially non-uniform radial deformation, can be problematic and can be caused when torque is applied to the driveshaft assembly by rotating the assembly in a clockwise direction or when torque is applied to the driveshaft assembly by rotating the assembly in a counterclockwise direction.

Accordingly, it would be desirable to provide an improved tube yoke that reduces the amount of radial deformation which occurs to a tube seat when torque is applied to the driveshaft assembly and enhances the performance of the driveshaft assembly by improving the interaction of the tube yoke and the driveshaft tube.

BRIEF SUMMARY OF THE INVENTION

The present invention is directed to a tube yoke for a driveshaft assembly.

In one embodiment, the tube yoke comprises a tube seat and a pair of lugs. The lugs outwardly project from the tube seat. In this embodiment, the tube seat comprises a base, a wall, and a plurality of stiffening ribs. The stiffening ribs extend between an inner surface of the base and an end surface of the wall and a portion of the stiffening ribs between the inner surface of the base and the end surface of the wall gradually decreases in thickness.

In another embodiment, the tube yoke comprises a tube seat and a pair of lugs. The tube seat comprises a base, a wall, and a plurality of stiffening ribs. The stiffening ribs are surrounded by the wall and are separated from an adjacent rib by a portion of the base. The pair of lugs outwardly project from the tube seat and are formed in a unitary manner therewith. Each lug has a crosshole. The crossholes are aligned so as to have a common centerline. The plurality of stiffening ribs are each oriented at an angle of approximately 45 degrees with respect to the common centerline of the crossholes.

In a third embodiment, the tube yoke comprises a tube seat and a pair of lugs. The tube seat comprises a base and a wall. The base and the wall each have inner surfaces which formed in a unitary manner with each other and include a generally conical shaped portion. The pair of lugs outwardly project from the tube seat and are formed in a unitary manner therewith. Each lug has a crosshole. The crossholes are aligned so as to have a common centerline.

DETAILED DESCRIPTION OF THE INVENTION

Figure 1:
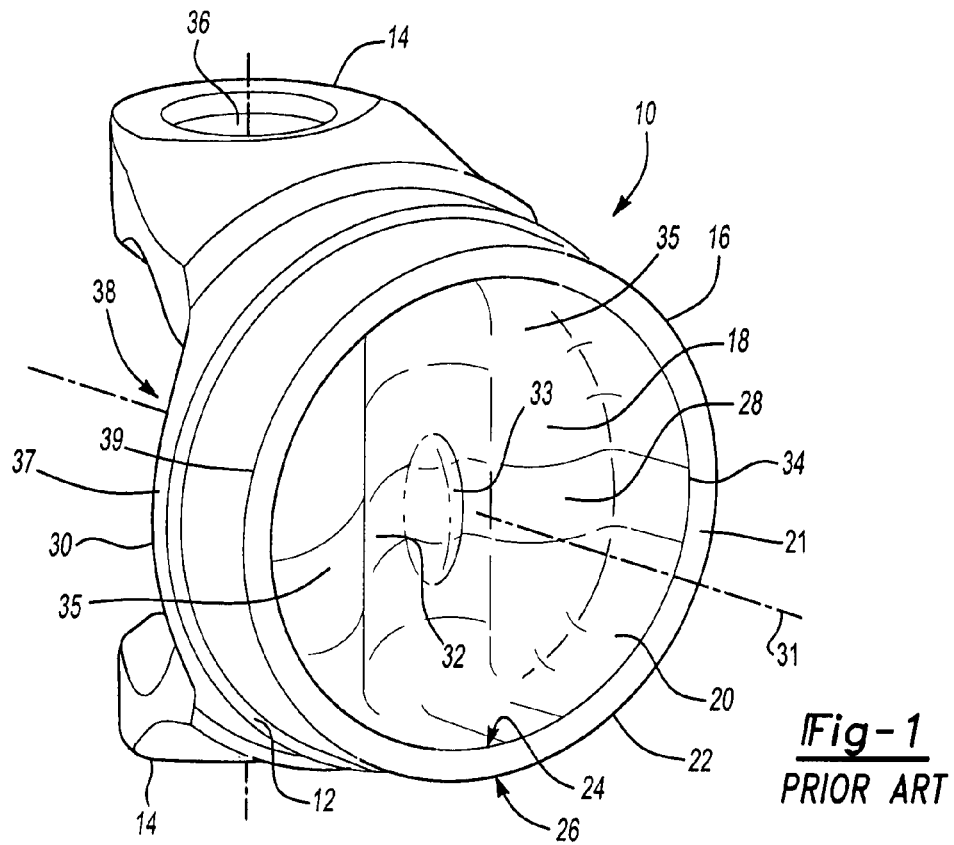
FIG. 1 is a perspective view of a tube yoke known in the art.

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

Additionally, the invention will be described in connection with a passenger vehicle driveshaft assembly. However, it would be understood by one of ordinary skill in the art that the tube yoke and method of reducing the deformation of a tube yoke described herein have applications to commercial and off-highway vehicle driveshaft assemblies. Furthermore, it would be understood by one of ordinary skill in the art that the tube yoke of the present invention could have industrial, locomotive, and aerospace applications.

Referring now to the drawings, there is illustrated in FIG. 1 a tube yoke 10 known in the art. The tube yoke 10 comprises a tube seat 12 and a pair of outwardly projecting lugs 14 attached to the tube seat 12.

The tube seat 12 comprises a wall 16 and a base 18. The wall 16 includes an inner surface 20, an end surface 21, and an outer surface 22. The base 18 has an inner surface 28 and an outer surface 30. The wall 16 is attached to the base 18 and is formed in a unitary fashion with the base 18. The wall 16 and the base 18 are concentric about an axis 31.

The inner surface 20 of the wall 16 substantially defines an inner circumference 24 and the outer surface 22 of the wall 16 substantially defines an outer circumference 26. Typically, the outer circumference 26 is attached to a driveshaft tube (not depicted) to form a driveshaft assembly. When the driveshaft assembly is formed, the base 18 is perpendicular with the driveshaft tube.

Along with the wall inner surface 20, the base inner surface 28 defines a cavity 34. The cavity 34 helps to reduce the weight of the tube yoke 10. The outer surface 30 of the base 18 defines an outer circumference 38 of the base 18. In an embodiment, the outer circumference 38 of the base 18 is greater than the outer circumference 26 of the wall 16. In this embodiment, the difference between the circumferences 26, 38 may decrease gradually from the base 18 to the wall 16.

The inner circumference 24 and outer circumference 26 of the wall 16 may be substantially uniform. As such, the wall 16 may have a uniform thickness. However, the inner circumference 24 of the wall 16 may gradually increase from where the wall 16 is attached to the base 18 to the end surface 21 of the wall 16. Additionally, the outer circumference 26 of the wall 16 may gradually decrease from where the wall 16 is attached to the base 18 to the end surface 21 of the wall 16. Thus, the wall 16 may gradually decrease in thickness from one end portion 37 of the tube seat 12 to the other 39.

In an embodiment, the base 18 has a center portion 32 and edges portions 35. The center portion 32 and edges portions 35 extend from the inner surface 28 to the outer surface 30 of the base 18. The edge portions 35 and are attached to the wall 16 on one end and the center portion 32 on another. The edge portions 35 separate portions of the center portion 32 from the wall 16. The center portion 32 is oriented in a generally perpendicular relationship to the axis 31 and has a generally rounded semi-cylindrical shape which extends from one edge of the inner surface 20 of the wall 16 to an opposite edge. The center portion 32 may have a raised portion 33 in its center. The raised portion 33 gradually reduces in thickness towards the wall 16.

The lugs 14 are formed in a unitary fashion with the tube seat 12. The lugs 14 are attached to the outer surface 30 of the base 18 and project outwardly therefrom. The lugs 14 are spaced apart from each other by approximately 180 degrees. Each lug 14 has a crosshole 36 which is formed through it. The crossholes 36 are aligned. In transmitting rotational power, the lugs 14 connect the driveshaft assembly to another portion of the driveline assembly (not depicted).

FIGS. 2-16 show additional embodiments of a tube yoke 40.

The tube yoke 40 comprises a tube seat 42 and a pair of lugs 44. Each lug 44 is formed in a unitary manner with the tube seat 42 and projects outwardly therefrom. When forming the driveshaft assembly, the tube seat 42 is attached to the driveshaft tube adjacent an end 45 of the tube seat 42. Preferably, the tube seat 42 is concentric with the driveshaft tube.

The tube seat 42 comprises a wall 46 and a base 48. The wall 46 is formed in a unitary manner with the base 48. In an embodiment, the tube seat 42 has an outer surface, defined by outer surfaces 52, 62 of the wall 46 and the base 48 that has a generally cylindrical shape. In this embodiment, the wall 46 and the base 48 are concentric about an axis 41.

The base 48 has an inner surface 60 and outer surface 62. When the tube yoke 40 is attached to a driveshaft tube, the inner surface 60 of the base 48 is positioned substantially perpendicularly to the driveshaft tube. The outer surface 62 defines an outer circumference 43 of the base 62.

Additionally, the base 48 has a center portion 64 which extends from its inner surface 60 to its outer surface 62. In an embodiment, the center portion 64 is located equidistant from the wall 46. In certain embodiments of the tube seat 42, which are best shown in FIGS. 8-16, the inner surface 60 of the base 48 adjacent the center portion 64 has a generally conical shape. In these embodiments, the conical shape may include a generally semi-spherical shaped portion.

The wall 46 is defined by an inner surface 50, an end surface 51, and outer surface 52. The inner surface 50 substantially defines an inner circumference 53 of the wall 46. In an embodiment best shown in FIG. 6, the inner surface 50 of the wall 46 may comprise a fillet 88 adjacent where the wall inner surface 50 and base inner surface 60 are attached. Also, the outer surface 52 of the wall 46 substantially defines an outer circumference 54 of the wall 46. In an embodiment, the outer circumference 43 of the base 48 is larger than the outer circumference 54 of the wall 46.

The wall 46 has a height 55 which can be measured as the distance from the inner surface 60 of the base 48 to the end surface 51 of the wall 46. The position of the inner surface 60 of the base 48 may vary between embodiments of the present invention. Accordingly, the height 55 of the wall 46 may vary between embodiments of the present invention as can the thickness of the base 48.

To form the driveshaft assembly, the wall 46 is attached to the driveshaft tube. Thus, after forming the driveshaft assembly, the outer surface 52 of the wall 46 abuts the driveshaft tube. In certain embodiments, the wall 46 is annular. Additionally, it may be preferable that the end surface 51 has a uniform thickness for facilitating the attachment of the tube yoke 40 to the driveshaft tube. Therefore, in certain embodiments, the inner circumference 53 and outer circumference 54 of the wall 46 are substantially uniform along the axis 41.

As discussed, the base outer surface 62 and the wall outer surface 52 define the outer surface of the tube seat 42. As illustrated, the lugs 44 project outwardly from the outer surface of the tube seat 42. More specifically, the lugs 44 are attached to the outer surface 62 of the base 48 and project outwardly therefrom.

The lugs 44 are spaced apart from each other by approximately 180 degrees. Each lug 44 has a crosshole 47 which is formed through it. The crossholes 47 are aligned so that they have a common centerline 49. In transmitting rotational power, the lugs 44 connect the driveshaft assembly to another portion of a driveline assembly (not depicted).

The tube seat 42 also comprises a plurality of stiffening ribs 68. The plurality of stiffening ribs 68 are attached to the wall 46 and the base 48. For example, the plurality of stiffening ribs 68 may be attached to the inner surfaces 50, 60 of the wall 46 and the base 48.

The plurality of stiffening ribs 68 reduce the amount of radial deformation experienced by the tube yoke 40 and, specifically, the tube seat 42 when a torque force is applied to the driveshaft assembly. For the purposes of explaining the advantages of the present invention, radial deformation shall refer to a change in the shape of the tube seat 42. Radial deformation, especially non-uniform radial deformation, can occur to a tube seat when torque is applied to the driveshaft assembly in a clockwise direction with respect to the axis 41 and when torque is applied in a counterclockwise direction with respect to the axis 41.

In the embodiments depicted in FIGS. 2-16, the plurality of stiffening ribs 68 includes four ribs. However, it should be appreciated that the present invention can be practiced with as few as two stiffening ribs and more than four stiffening ribs. Each stiffening rib 68 comprises an outer end portion 70, a middle portion 72, an inner end portion 74, and a pair of side portions 76.

The inner surfaces 50, 60 of the wall 46 and the base 48 and the portions 70, 72, 74, 76 of the stiffening ribs 68 define an inner surface of the tube seat 42. The inner surface of the tube seat 42 extends between the inner surface 60 of the base 48 and the end surface 51 of the wall 46. Portions of the inner surfaces 50, 60 of the wall 46 and the base 48 and the plurality of stiffening ribs 68 may vary between embodiments of the present invention.

Thus, portions of the inner surface of the tube seat 42 can vary between embodiments of the present invention.

Figure 2:
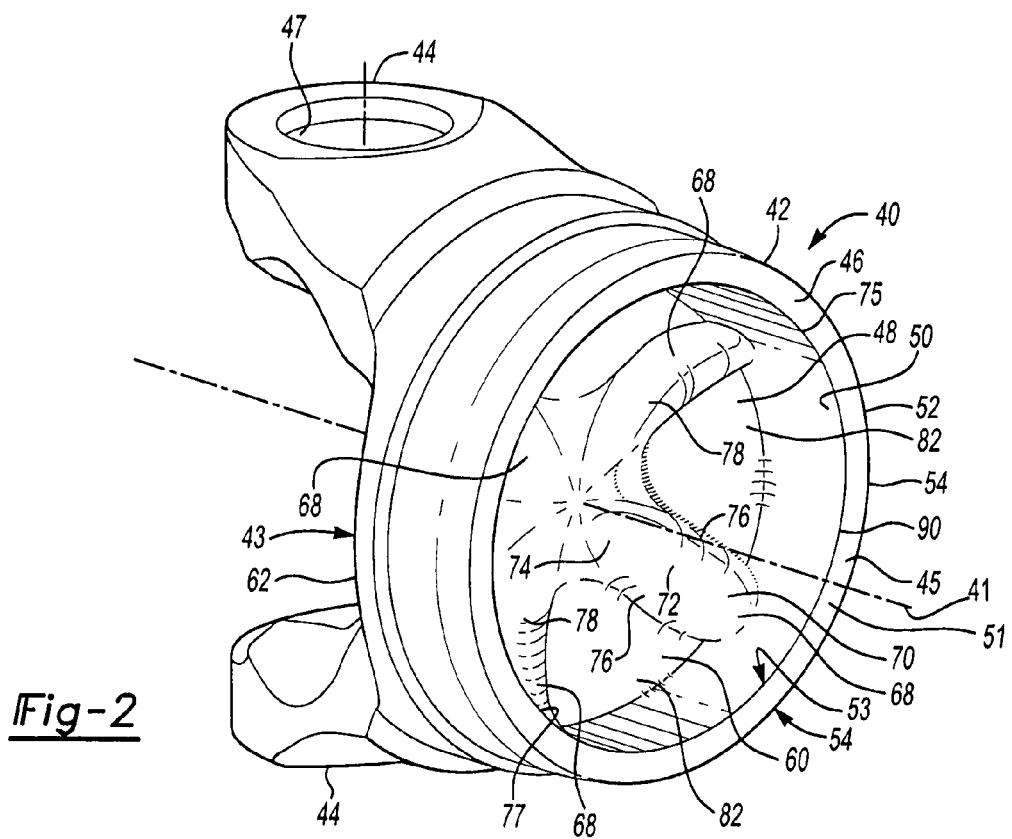
FIG. 2 is a perspective view of a tube yoke in accordance with an embodiment of the invention.
Figure 5:
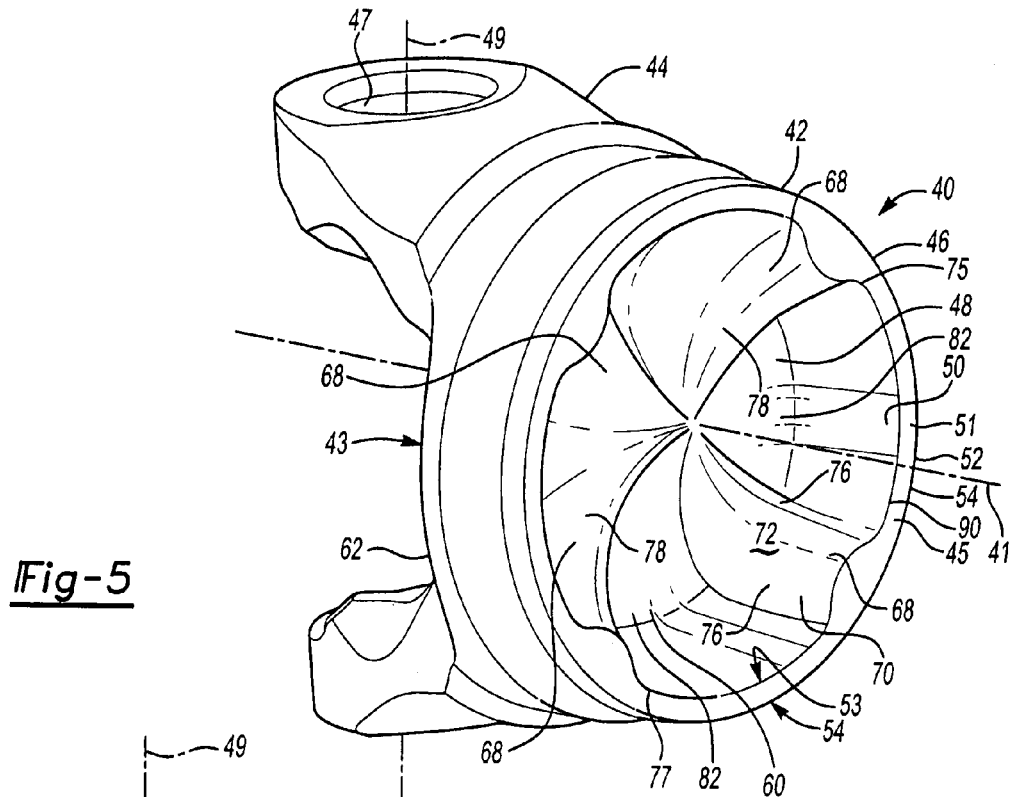
FIG. 5 is a perspective view of a tube yoke in accordance with an embodiment of the invention.
Figure 6:
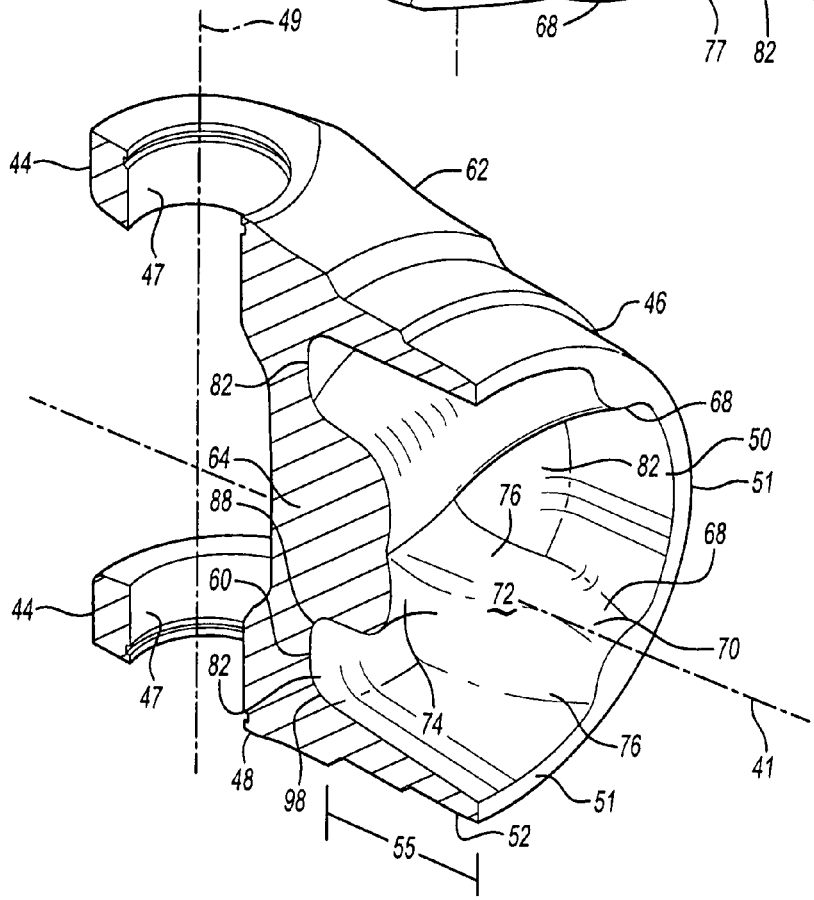
FIG. 6 is a perspective sectional view of the tube yoke of FIG. 5.
Figure 7:
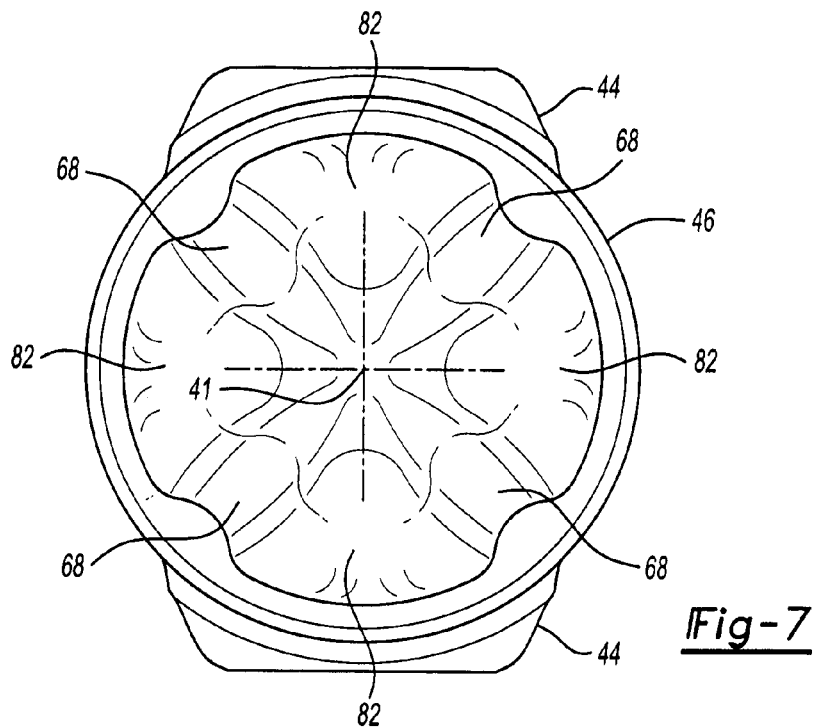
FIG. 7 is a front view of the tube yoke of FIG. 5.

In certain embodiments, like those depicted in FIGS. 2 and 5, the plurality of stiffening ribs 68 are formed in a unitary manner with each other. In these embodiments, each rib inner end portion 74 is attached to an adjacent rib inner end portion 74 proximate the center portion 64 of the base 48. In other embodiments, like those depicted in FIGS. 8, 11 and 14, the plurality of stiffening ribs 68 are not formed as a unitary body. In these embodiments, the stiffening ribs 68 terminate adjacent the center portion 64 of the base 48.

Preferably, the plurality of stiffening ribs 68 are formed in a unitary manner with the wall 46 and the base 48. For example, the plurality of stiffening ribs 68 may be formed in a unitary manner with the inner surface 50 of the wall 46 and/or the inner surface 60 of the base 48. However, it should be appreciated that the plurality of stiffening ribs 68 need not be formed in a unitary manner with either the wall 46 or the base 48 to practice the invention.

Figure 8:
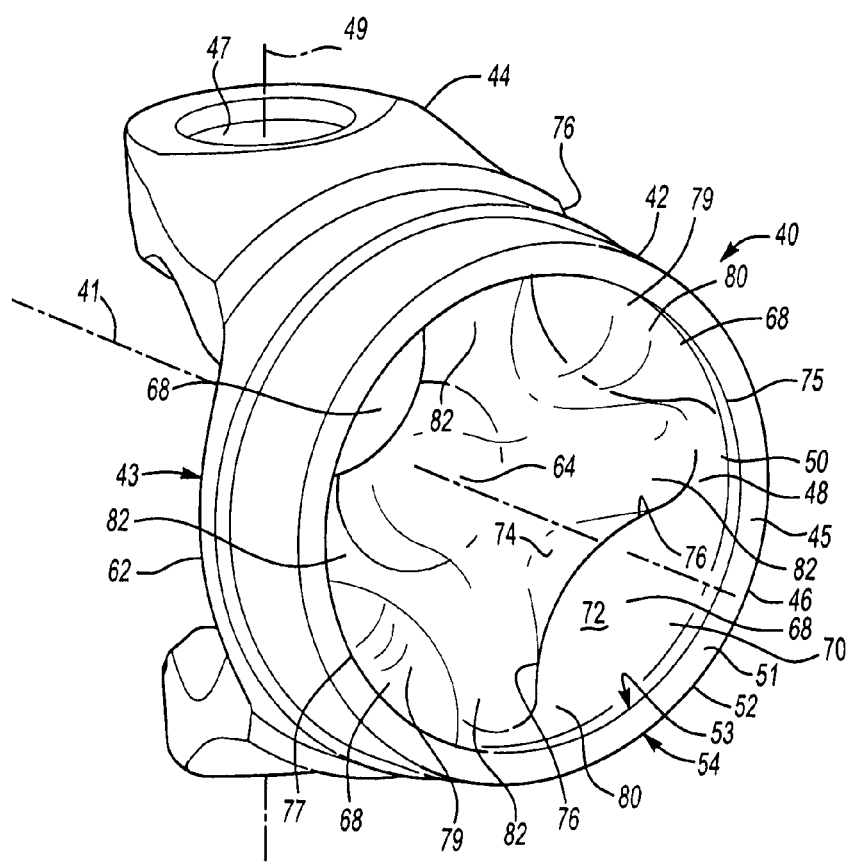
FIG. 8 is a perspective view of a tube yoke in accordance with an embodiment of the invention.
Figure 9:
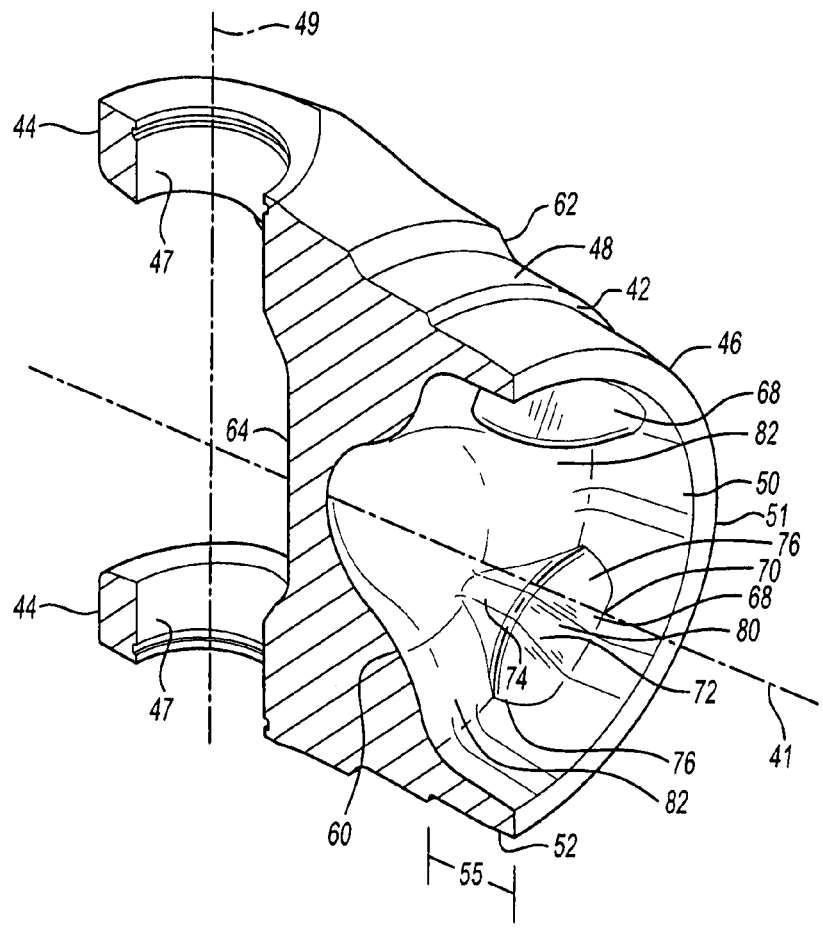
FIG. 9 is a perspective sectional view of the tube yoke of FIG. 8.
Figure 12:
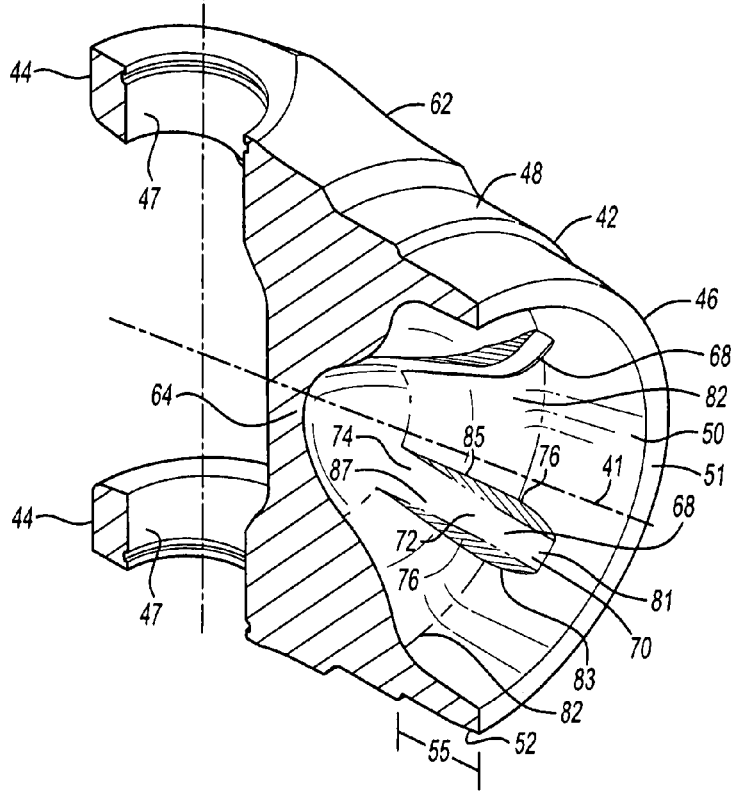
FIG. 12 is a perspective sectional view of the tube yoke of FIG. 11.
Figure 13:
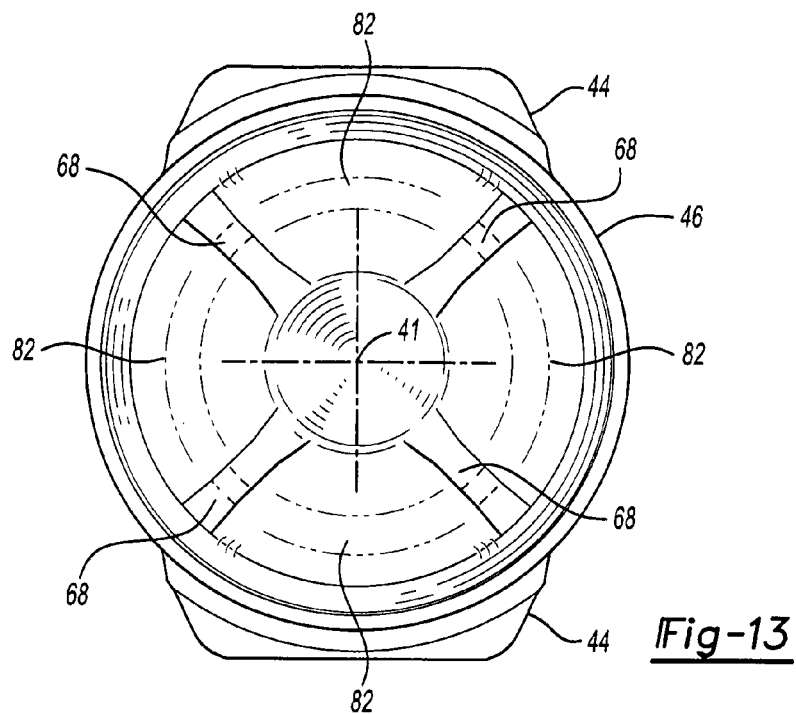
FIG. 13 is a front view of the tube yoke of FIG. 11.
Figure 14:
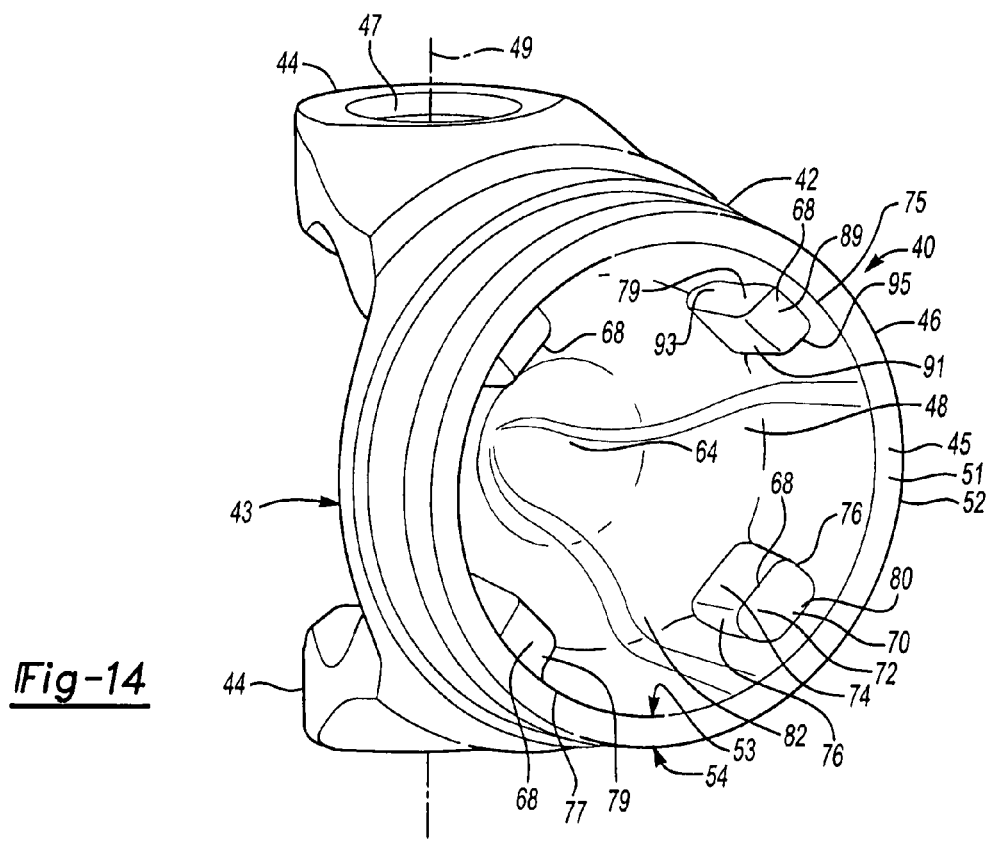
FIG. 14 is a perspective view of a tube yoke in accordance with an embodiment of the invention.
Figure 15:
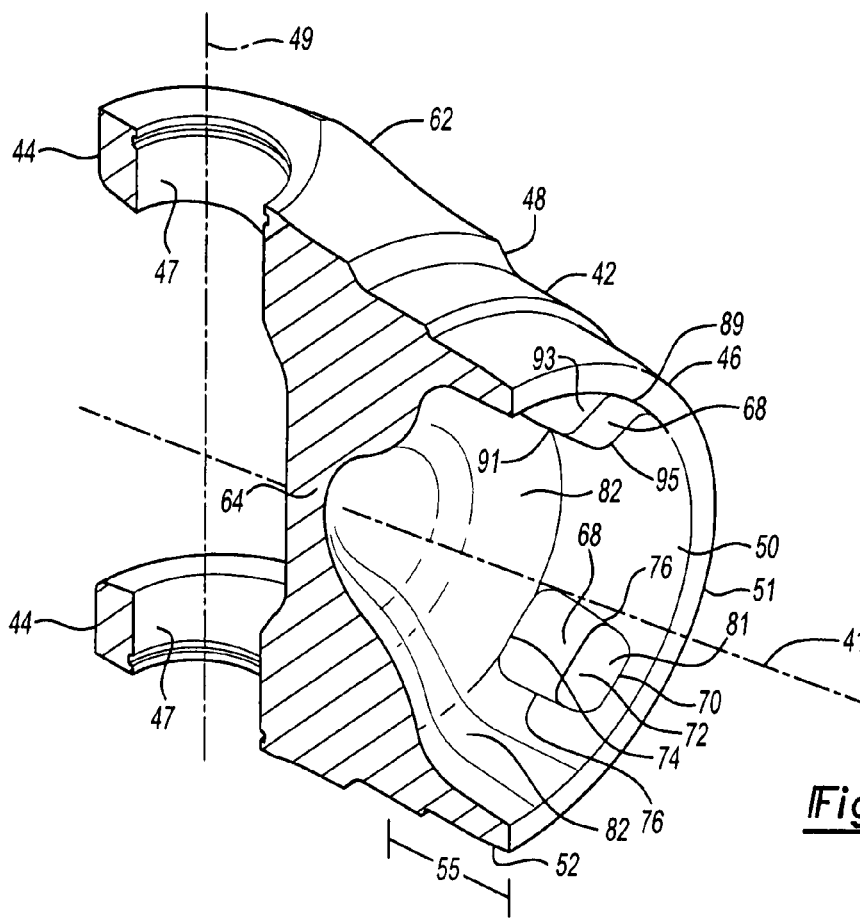
FIG. 15 is a perspective sectional view of the tube yoke of FIG. 14.
Figure 16:
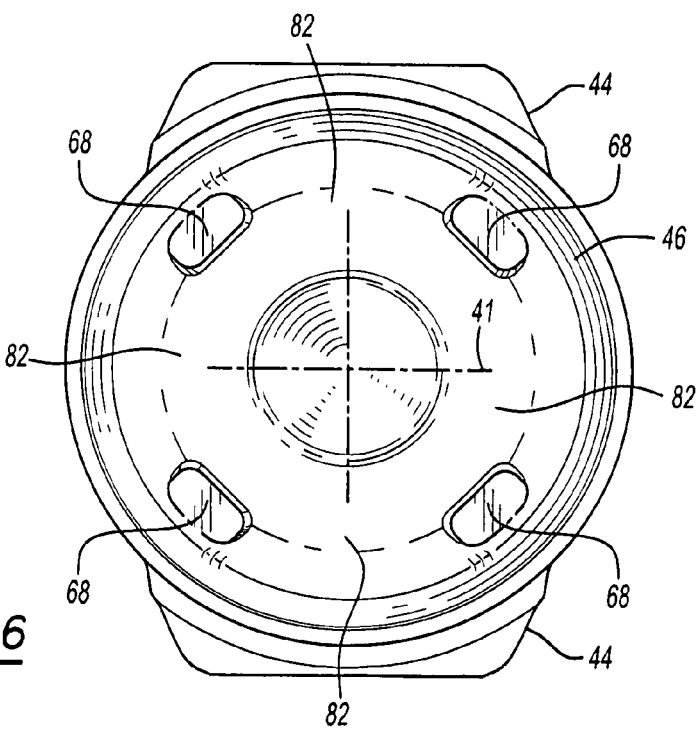
FIG. 16 is a front view of the tube yoke of FIG. 14.

The wall 46 surrounds the plurality of stiffening ribs 68. As shown in the embodiments depicted in FIGS. 2 and 5, at least one pair 78 of stiffening ribs 68 may extend from an inner edge 75 to an opposite inner edge 77 of the wall 46. However, in other embodiments, like those shown in FIGS. 8, 11 and 14, a pair of stiffening ribs 79 do not extend from inner edge 75 to inner edge 77 of the wall 46. In these embodiments, the stiffening ribs 68 are at least separated by the center portion 64 of the base 48. As best shown in FIGS. 9, 12, 15, in these embodiments the inner surface 60 of the base 48 adjacent the center portion 64 has a generally conical shape and may include a semi-spherical shaped portion.

The stiffening rib outer end portions 70 are attached to the inner surface 50 of the wall 46. However, their position with respect to the wall 46 may vary. In certain embodiments, like those depicted in FIGS. 2, 8, 11 and 14, the rib outer end portions 70 are attached to the wall 46 but they do not extend the full height 55 of the wall 46. In these embodiments, the rib outer end portions 70 may extend less than half the height 55, approximately half of the height 55, or more than half of the height 55 of the wall 46. However, as depicted in the embodiment shown in FIG. 5, the rib end outer portions 70 may extend approximately the entire height 55 of the wall 46. In this embodiment, the rib outer end portions 70 terminate adjacent the end surface 51 of the wall 46.

As discussed, each stiffening rib 68 is also attached to the base 48. However, each stiffening rib 68 is separated from its neighboring rib(s) by a portion 82 of the inner surface 60 of the base 48. Additionally, these portions 82 of the base 48 may assume a variety of shapes, sizes and configurations.

Figure 3:
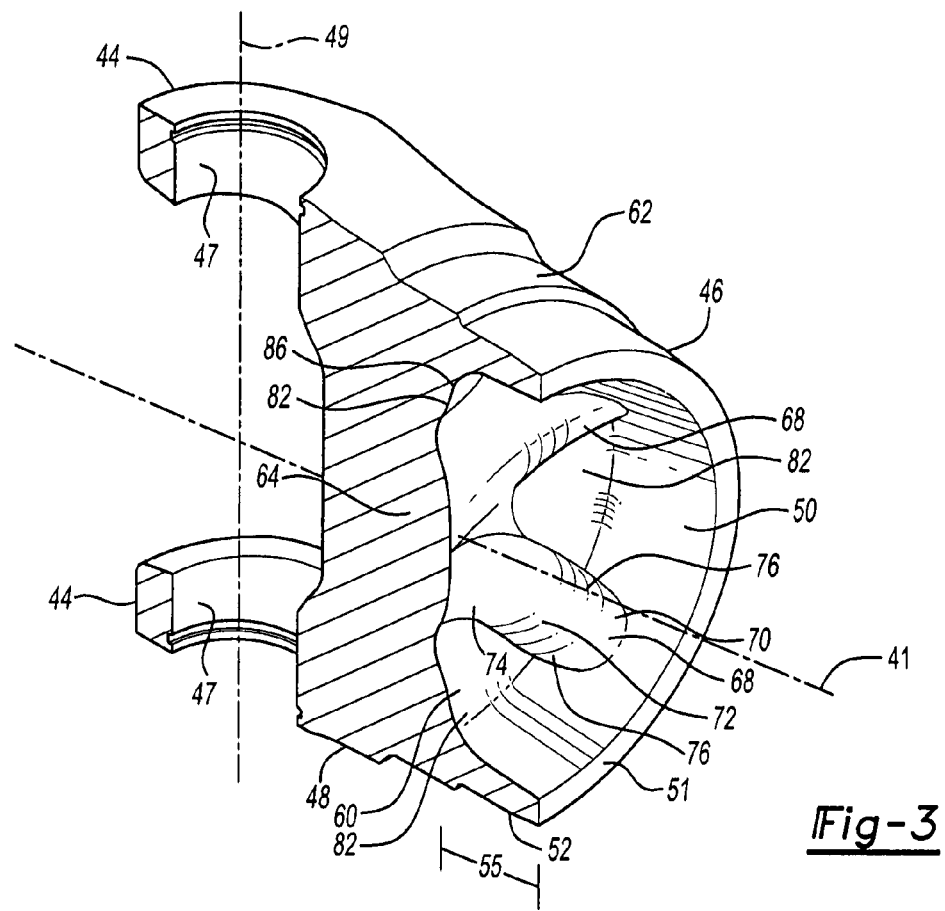
FIG. 3 is a perspective sectional view of the tube yoke of FIG. 2.
Figure 4:
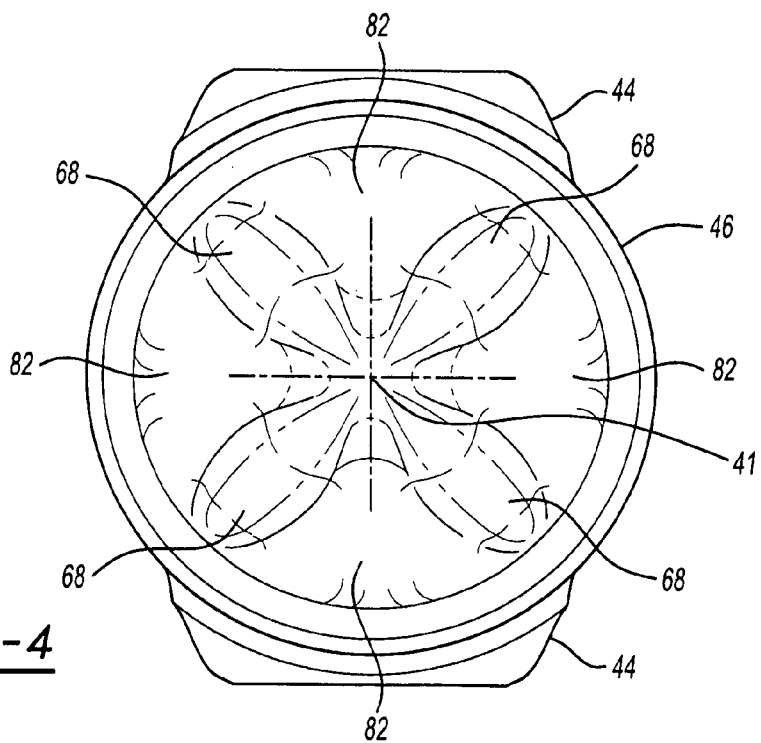
FIG. 4 is a front view of the tube yoke of FIG. 2.

For example, in an embodiment best shown in FIG. 3, the portions 82 of the base inner surface 60 separating the plurality of stiffening ribs 68 may have a tapered profile 86. In another embodiment, the plurality of stiffening ribs 68 are positioned so as to form a unitary cross pattern and the rib side portions 76 are spaced apart from each other at an angle of approximately 90 degrees. In this embodiment, the base portions 82 may have a generally triangular or pie shape. Also, the base portions 82 may be defined by the rib side portions 76 and the inner surface 50 of the wall 46.

However, those skilled in the art would appreciate that the portions 82 of the base 48 which separate the plurality of stiffening ribs 68 may be provided in a number of alternative shapes or defined in other fashions. Thus, in other embodiments, the portions 82 of the inner surface 60 of the base 48 separating the plurality of stiffening ribs 68 may be generally elliptical, semi-circular, rectangular, or polygonal shaped. Additionally, the base portions 82 may only be partially defined by the rib side portions 76 and/or the inner surface 50 of the wall 46.

Figure 10:
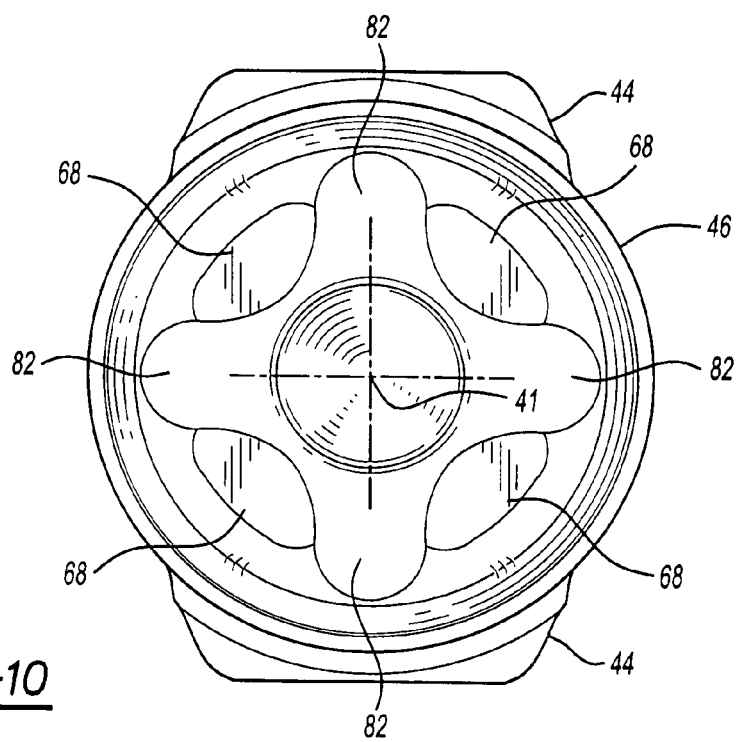
FIG. 10 is a front view of the tube yoke of FIG. 8.
Figure 11:
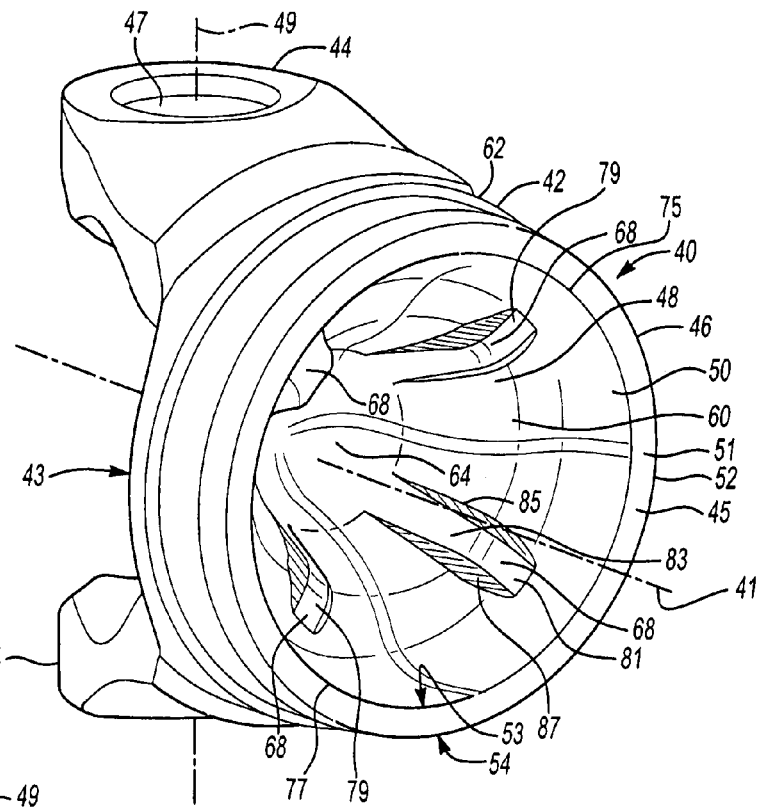
FIG. 11 is a perspective view of a tube yoke in accordance with an embodiment of the invention.

Features of the stiffening ribs 68 may also vary between embodiments of the present invention. For example, in the embodiment shown in FIGS. 5-7, the plurality of stiffening ribs 68 may each comprise a fillet 88 on each side portion 76 adjacent where the stiffening rib 68 attaches to the inner surface 60 of the base 48. In another embodiment, which is depicted in FIGS. 8-10, each stiffening rib 68 has a single discrete top surface 80.

However, it should be appreciated that the present invention may be practiced when the stiffening ribs 68 have a plurality of discrete surfaces or when the discrete surface is not the top surface 80. For example, in the embodiment shown in FIGS. 11-13, each stiffening rib 68 has at least four discrete surfaces. In this embodiment, there exists a discrete top surface 81, a front surface 83, and side surfaces 85, 87. Additionally, each surface 81, 83, 85, 87 has a generally rectangular shape. Those skilled in the art would appreciate that the present invention is not limited to discrete surfaces having only a generally rectangular shape. For example, in a related embodiment shown in FIGS. 14-16, each stiffening rib 68 has a discrete top surface 89, front surface 91, and two side surfaces 93, 95. However, the front and top surfaces 89, 91 have a generally square shape. Whereas, the side surfaces 93, 95 have a generally triangular shape.

Of course it should be appreciated that the plurality of stiffening ribs 68 need not have surfaces which are discrete in order to practice the present invention. As shown in the embodiments depicted in FIGS. 2 and 5, the stiffening ribs 68 do not have discrete top, front, or side surfaces. Rather, in these embodiments, the portions 82 of the base inner surface 60 and the plurality of stiffening ribs 68 provide a series of alternating crests and valleys. Thus, along with the wall 46 which surrounds them, the base inner surface 60 and the plurality of stiffening ribs 68 define an undulating cavity 90.

As depicted in the embodiments illustrated in FIGS. 2, 5, 8, 11 and 14, the plurality of stiffening ribs 68 are attached to the inner surface 50 of the wall 46 between the inner surface 60 of the base 48 and the end surface 51 of the wall 46. In these embodiments, a portion of the stiffening ribs 68 between the inner surface 60 of the base 48 and the end surface 51 of the wall 46 gradually decreases the thickness. For example, the thickness of each stiffening rib 68 may gradually decreases from its inner end portion 74 to where its outer end portion 70 is attached to the inner surface 50 of the wall 46. In another embodiment, the thickness of each stiffening rib 68 may gradually decrease from its side portions 76 to where its outer end portion 70 is attached to the inner surface 50 of the wall 46. In yet another embodiment, the thickness of each stiffening rib 68 may gradually decrease from its middle portion 72 to where its outer end portion 70 is attached to the inner surface 50 of the wall 46. Additionally, as shown in FIGS. 2 and 5 the thickness of the unitarily formed stiffening ribs 68 may gradually decreases from adjacent the center portion 64 of the base 48 to the inner surface 50 of the wall 46, specifically, to where each stiffening rib's outer end portion 70 is attached to the inner surface 50 of the wall 46.

In an embodiment, each stiffening rib 68 is oriented at an acute angle with respect to the common centerline 49 of the crossholes 47. In another embodiment, each stiffening rib 68 is oriented at same angle as an adjacent stiffening rib 68 with respect to the common centerline 49 of the crossholes 47. More specifically, when included as a component of the driveshaft assembly and under certain torque forces, the tube yoke 40 may undergo a certain amount of non-uniform radial deformation. The areas of greatest non-uniform radial tube seat deformation may be adjacent a portion of the tube seat 42 which is oriented at an angle of approximately 45 degrees with respect to the common centerline 49 of the crossholes 47. Thus, in an embodiment, each stiffening rib 68 is oriented at an angle of approximately 45 degrees with respect to the common centerline 49 of the crossholes 47.

It should however be appreciated that the orientation of the stiffening ribs 68 with respect to the lugs 44, specifically the common centerline 49 of the crossholes 47, may vary without departing from the scope of the present invention. Additionally, the orientation of the stiffening ribs 68 with respect to the wall 46 and the base 48 may vary without departing from the scope of the present invention.

FIGS. 17-20 depict additional embodiments of a tube yoke 100, 120 for a driveshaft assembly.

When utilizing the tube yokes 100, 120 it is preferable that they are attached to a driveshaft tube (not depicted) to form the driveshaft assembly.

Figure 17:
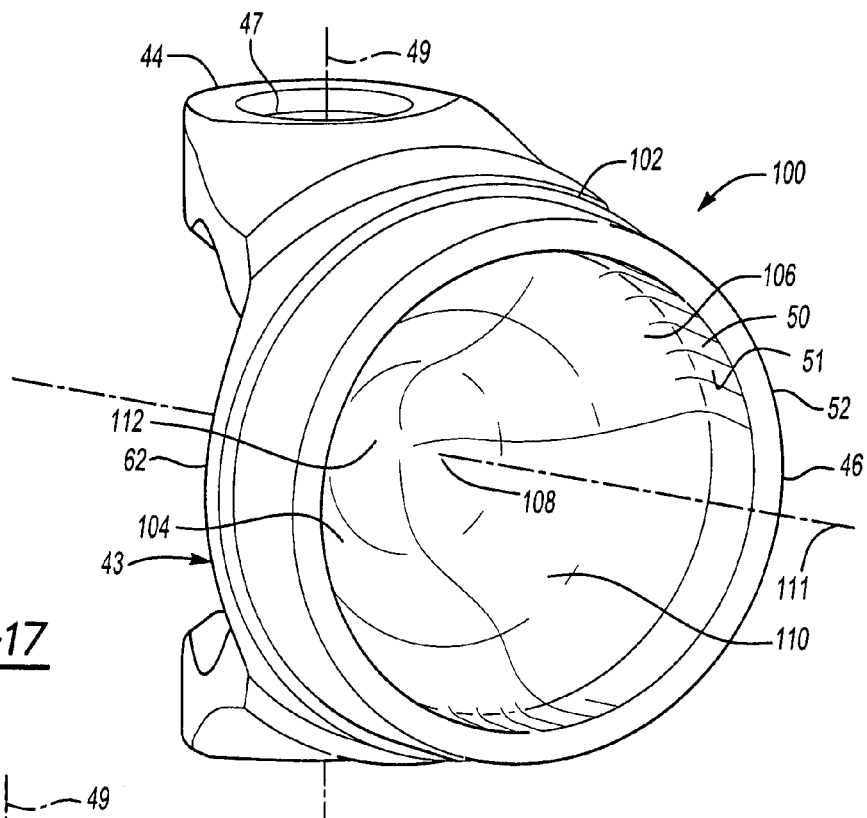
FIG. 17 is a perspective view of a tube yoke in accordance with an embodiment of the invention.
Figure 18:
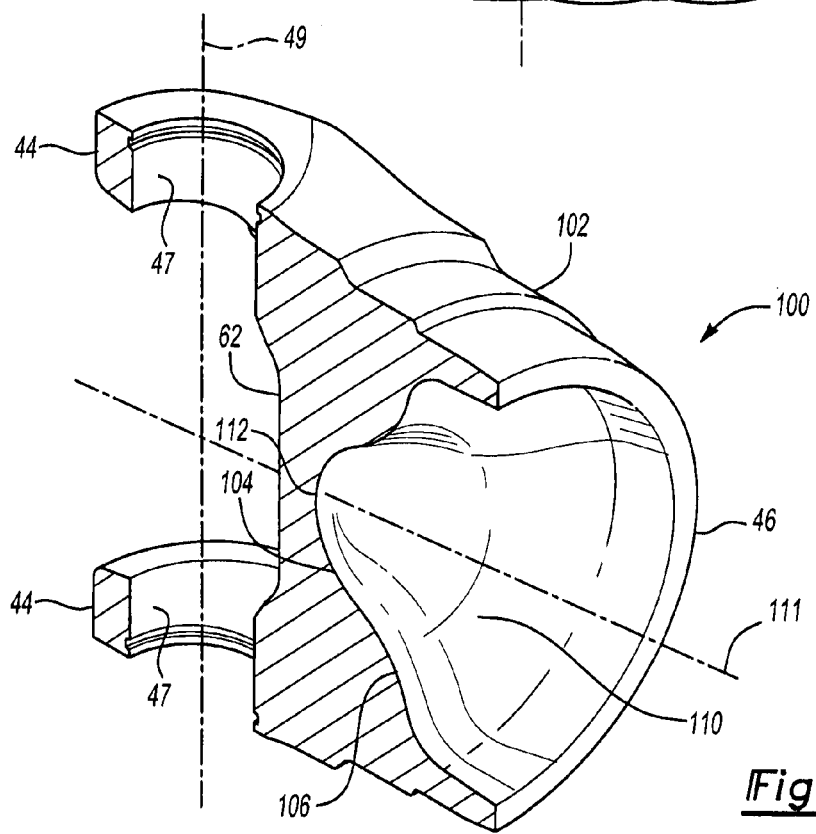
FIG. 18 is a perspective sectional view of the tube yoke of FIG. 17.

As depicted in FIGS. 17 and 18, in an embodiment the tube yoke 100 comprises a tube seat 102 and the pair of outwardly projecting lugs 44. The lugs 44 are formed in a unitary manner with the tube seat 102.

The tube seat 102 comprises the wall 46 and a base 104. The wall 46 and the base 104 are formed in a unitary manner. Additionally, the wall 46 and the base 104 are concentric about an axis 111.

The base 104 has an inner surface 106 and outer surface 62. The inner surface 106 of the base 104 and the inner surface 50 of the wall 46 define an inner surface of the tube seat 102. The inner surface of the tube seat 102 extends between the inner surface 106 of the base 104 and the end surface 51 of the wall 46.

The base 104 also has a center portion 108 which extends from the inner surface 106 to the outer surface 62. The inner surface 106 has edge portions 110 and a rounded middle portion 112. The middle portion 112 and the edge portions 110 are coaxial and are formed in a unitary manner. In an embodiment, the middle portion 112 is adjacent the center portion 108 and the edge portions 108 completely surround the middle portion 112 separating it from the inner surface 106 of the wall 46. In another embodiment, the middle portion 112 has a generally conical shape. In this embodiment, the middle portion 112 may also include a semi-spherical shaped portion.

As best shown in FIG. 18, the edge portions 110 taper to the middle portion 112 and the wall 46. Thus, the thickness of the base 104 gradually decreases from the edge portions 110 to the middle portion 112 and from the edge portions 110 to the wall 46 to provide the inner surface of the tube seat 102 with a generally conical shape. In this embodiment, the inner surface of the tube seat 102 may be substantially uniform about the axis 111. Thus, its conical shape may also be substantially uniform about the axis 111.

Figure 19:
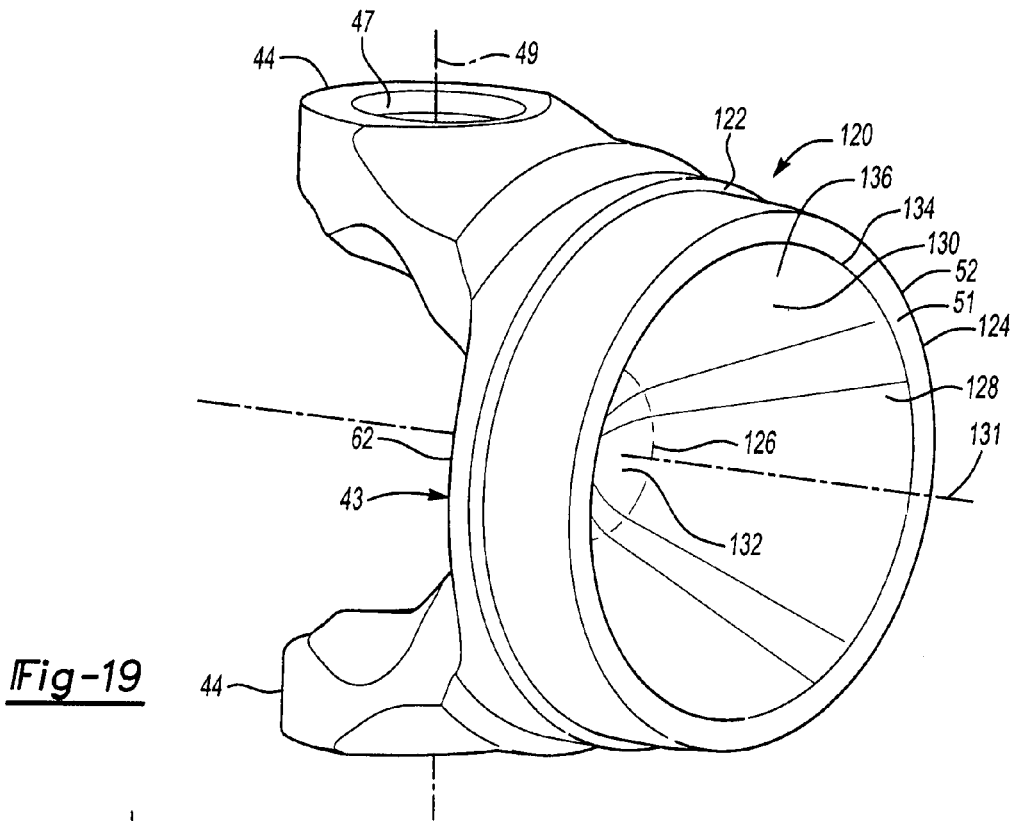
FIG. 19 is a perspective view of a tube yoke in accordance with an embodiment of the invention.
Figure 20:
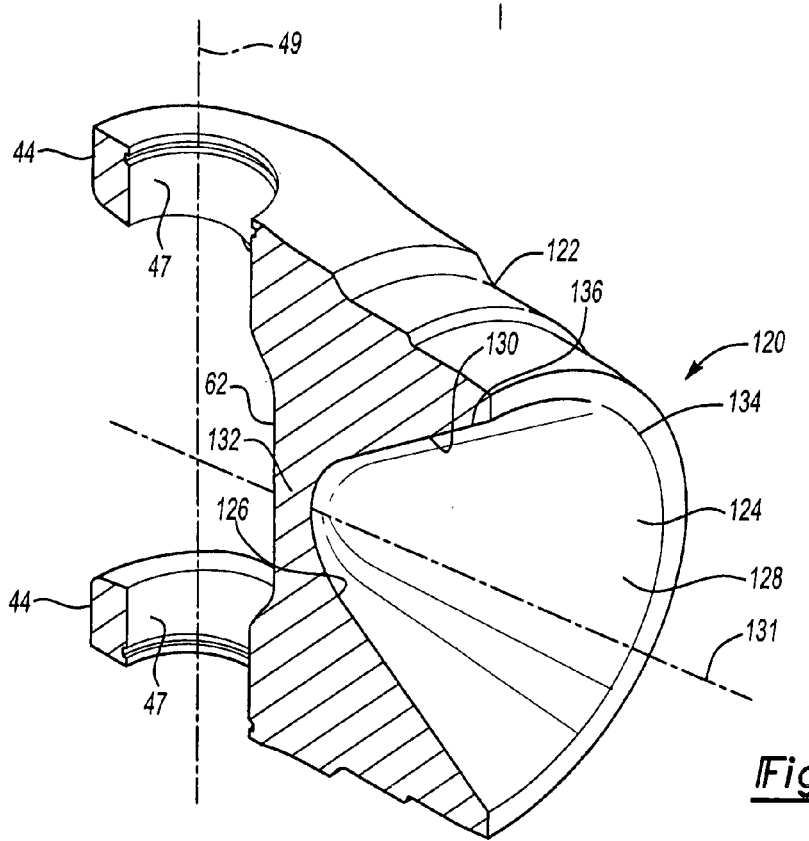
FIG. 20 is a perspective sectional view of the tube yoke of FIG. 19.

As shown in the embodiment depicted in FIGS. 19 and 20, the tube yoke 120 comprises a tube seat 122 and the pair of outwardly projecting lugs 44. The lugs 44 are formed in a unitary manner with the tube seat 122.

The tube seat 122 comprises a wall 124 and a base 126. The wall 124 and the base 126 are formed in a unitary manner. Additionally, the wall 124 and the base 126 are concentric about an axis 131.

The wall 124 has an inner surface 128, end surface 51, and outer surface 52. The base 126 has an inner surface 130 and outer surface 62. The inner surface 130 of the base 104 and the inner surface 128 of the wall 124 define an inner surface of the tube seat 122. The inner surface of the tube seat 122 extends between the inner surface 130 of the base 126 and the end surface 51 of the wall 124.

As best seen in FIG. 20, the inner surfaces 128, 130 of the wall 124 and the base 126 provide the inner surface of the tube seat 122 with a generally conical shape. The inner surface of the tube seat 122 may be substantially uniform about the axis 131. Thus, its conical shape may also be substantially uniform about the axis 131.

In this embodiment, the inner surface 128 of the wall 124 tapers from a first end 134 to a second end portion 136. The second end portion 136 is unitary with the inner surface 130 of the base 126. The inner surface 130 of the base 126 tapers till it reaches a center portion 132 of the base 126. The center portion 132 extends from the inner surface 130 to the outer surface 62 of the base 126. The inner surface 130 of the base 126 adjacent the center portion 132 is rounded such that it may include a generally semi-spherical shaped portion. Thus, as illustrated and described, the thickness of the tube seat 122 gradually decreases between the inner surface 130 of the base 126 and the end surface 51 of the wall 124.

It should be appreciated that the tube yokes 40, 100, 120 can be made of any suitable material but are preferably metallic. It is also preferable that the tube yokes 40, 100, 120 are formed as a unitary body.

Referring back to FIGS. 2-16, the tube yoke 40 having a plurality of stiffening ribs 68 provides a significant reduction in non-uniform radial tube seat deformation experienced by the tube yoke 40 when compared with known tube yoke designs. In fact, in certain embodiments, the non-uniform radial deformation of a tube seat can be reduced to below 0.10 mm. For example, non-uniform radial tube seat deformation of 0.143 mm can be reduced to 0.089 mm for a tube seat for driveshaft assembly with a 4" diameter driveshaft tube. This represents a 38% reduction in non-uniform radial tube seat deformation. The present invention can reduce non-uniform radial deformation of a tube seat for a driveshaft assembly with a 5" diameter driveshaft tube as well. For this tube seat, the non-uniform radial deformation can be reduced from 0.174 mm to 0.102 mm which represents a 41% reduction in non-uniform radial tube seat deformation. Of course, it should be appreciated that the present invention can be utilized to reduce the non-uniform radial deformation of tube seats intended for use in both larger and smaller driveshaft assemblies.

It should be noted that in the above-described examples that the torque force was applied in both a clockwise and a counterclockwise direction. However, the present invention is not limited to a specific direction of applied torque as the present invention can reduce the non-uniform radial deformation of a driveshaft assembly tube yoke regardless of which direction torque is applied to the driveshaft. Thus, the present invention also includes a method of reducing the radial deformation of the tube yoke of a driveshaft assembly.

The method of reducing the radial deformation of a driveshaft assembly comprises providing a driveshaft assembly. The driveshaft assembly includes a driveshaft tube and a tube yoke 40, 100, 120. The driveshaft tube is attached to the tube yoke 40, 100, 120. The tube yoke 40, 100, 120 comprises a tube seat 42, 102, 122 having a base 48, 104, 126 and a wall 46, 124.

The method also includes reducing the amount of radial deformation of the tube seat 42, 102, 122. In an embodiment, the amount of radial deformation of the tube seat 42 is reduced by providing a plurality of stiffening ribs 68 attached to the tube seat 42. In another embodiment, the amount of radial deformation of the tube seat 42, 102, 122 may be reduced by forming an inner surface of the tube seat 42, 102, 122 with a generally conical shaped portion. The method may further comprise applying a torque to the driveshaft assembly. The magnitude of the torque may vary.

In accordance with the provisions of the patent statutes, this invention has been explained and illustrated in its preferred embodiments. However, it must be understood that this invention may be practiced otherwise than as specifically explained and illustrated without departing from its spirit or scope.

What we claim is:

1. A tube yoke for a driveshaft assembly, comprising:
    a tube seat comprising a base, a wall, and a plurality of stiffening ribs, wherein the wall has a height, the stiffening ribs extend between an inner surface of the base and an end surface of the wall and each stiffening rib comprises an outer end portion which is attached to a middle portion and a pair of side portions and extends less than the height of the wall; and
    a pair of lugs outwardly projecting from the tube seat;
    wherein each stiffening rib gradually decreases in thickness from the side portions to the outer end portion and from the middle portion to the outer end portion.

2. The tube yoke defined in claim 1, wherein the plurality of stiffening ribs are attached to an inner surface of the wall such that the wall surrounds the plurality of stiffening ribs.

3. The tube yoke defined in claim 2, wherein the plurality of stiffening ribs are formed in a unitary manner with the wall.

4. The tube yoke defined in claim 2, wherein the plurality of stiffening ribs equals four ribs.

5. The tube yoke defined in claim 2, wherein the outer end portions of the stiffening ribs extend approximately half of the height of the wall.

6. The tube yoke defined in claim 2, wherein each lug has a crosshole, the crossholes having a common centerline, and each of the stiffening ribs is oriented at an acute angle with respect to the common centerline of the crossholes.

7. The tube yoke defined in claim 6, wherein the angle is approximately 45 degrees.

8. The tube yoke defined in claim 6, wherein each of the stiffening ribs is oriented at the same angle as an adjacent rib with respect to the common centerline of the crossholes.

9. The tube yoke defined in claim 1, wherein the plurality of stiffening ribs are separated from each other by portions of the inner surface of the base.

10. The tube yoke defined in claim 9, wherein each stiffening rib is spaced apart from an adjacent stiffening rib at an angle of approximately 90 degrees with respect to a central axis extending through the base.

11. The tube yoke defined in claim 9, wherein the base portions and plurality of stiffening ribs provide a series alternating crests and valleys which are surrounded by an annular wall.

12. The tube yoke defined in claim 9, wherein the base portions have a tapered profile.

13. The tube yoke defined in claim 1, wherein the plurality of stiffening ribs are attached to the base and the wall and reduce the amount of radial deformation experienced by the tube seat when a torque force is applied.

14. The tube yoke defined in claim 13, wherein the plurality of stiffening ribs are formed in a unitary manner.

15. The tube yoke defined in claim 13, wherein the tube seat does not radially deform by more than 0.10 mm.

16. A tube yoke for a driveshaft assembly, comprising:
    a tube seat comprising a base, a wall and a plurality of stiffening ribs, wherein the wall has a height and the stiffening ribs are surrounded by the wall and separated from an adjacent stiffening rib by a portion of the base and each stiffening rib comprises an outer end portion which is attached to a middle portion and a pair of side portions and extends less than the height of the wall, wherein each stiffening rib gradually decreases in thickness from the side portions to the outer end portion and from the middle portion to the outer end portion; and
    a pair of lugs outwardly projecting from the tube seat and formed in a unitary manner therewith, wherein each lug has a crosshole and the crossholes are aligned so as to have a common centerline;
    wherein each stiffening rib is oriented at an angle of approximately 45 degrees with respect to the common centerline of the crossholes.

17. The tube yoke defined in claim 16, wherein the plurality of stiffening ribs are configured in a unitary cross pattern.

* * * * *